United States Patent Office 3,290,658

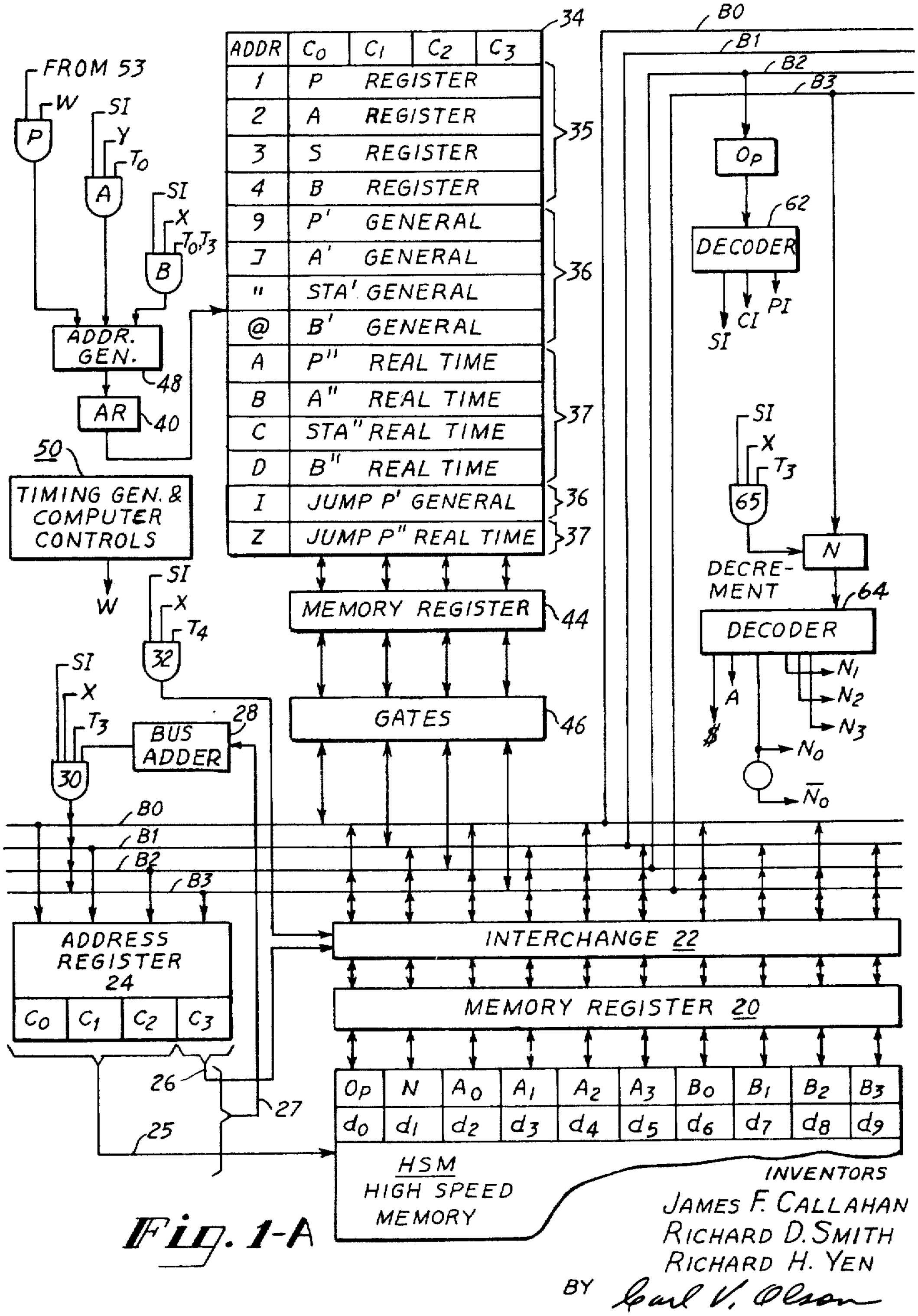
Fig. 1-A
INVENTORS
JAMES F. CALLAHAN
RICHARD D. SMITH
RICHARD H. YEN
BY Carl V. Olson
ATTORNEY

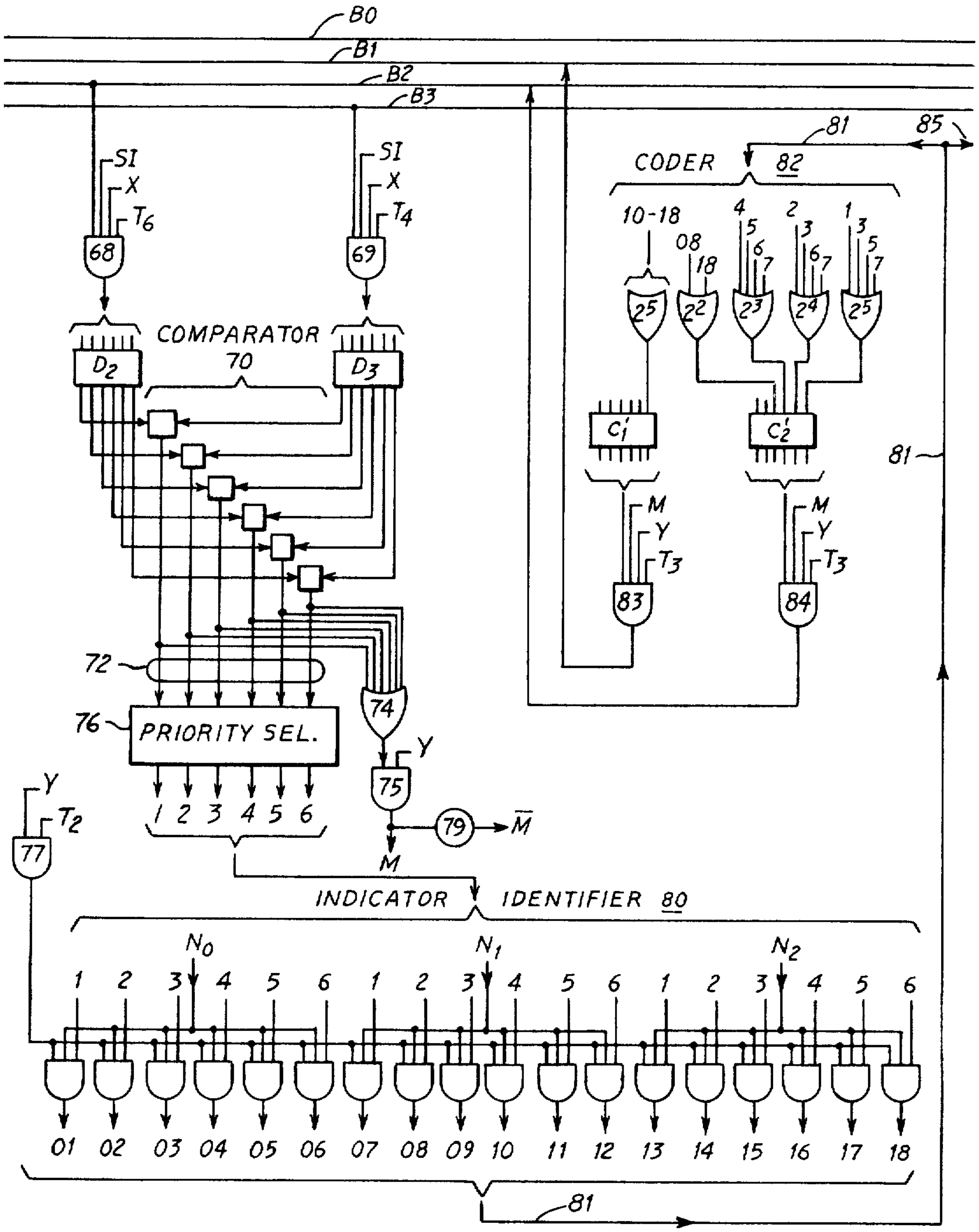
Fig. 1-B
INVENTORS
JAMES F. CALLAHAN
RICHARD D. SMITH
RICHARD H. YEN
BY Carl V. Olson
ATTORNEY

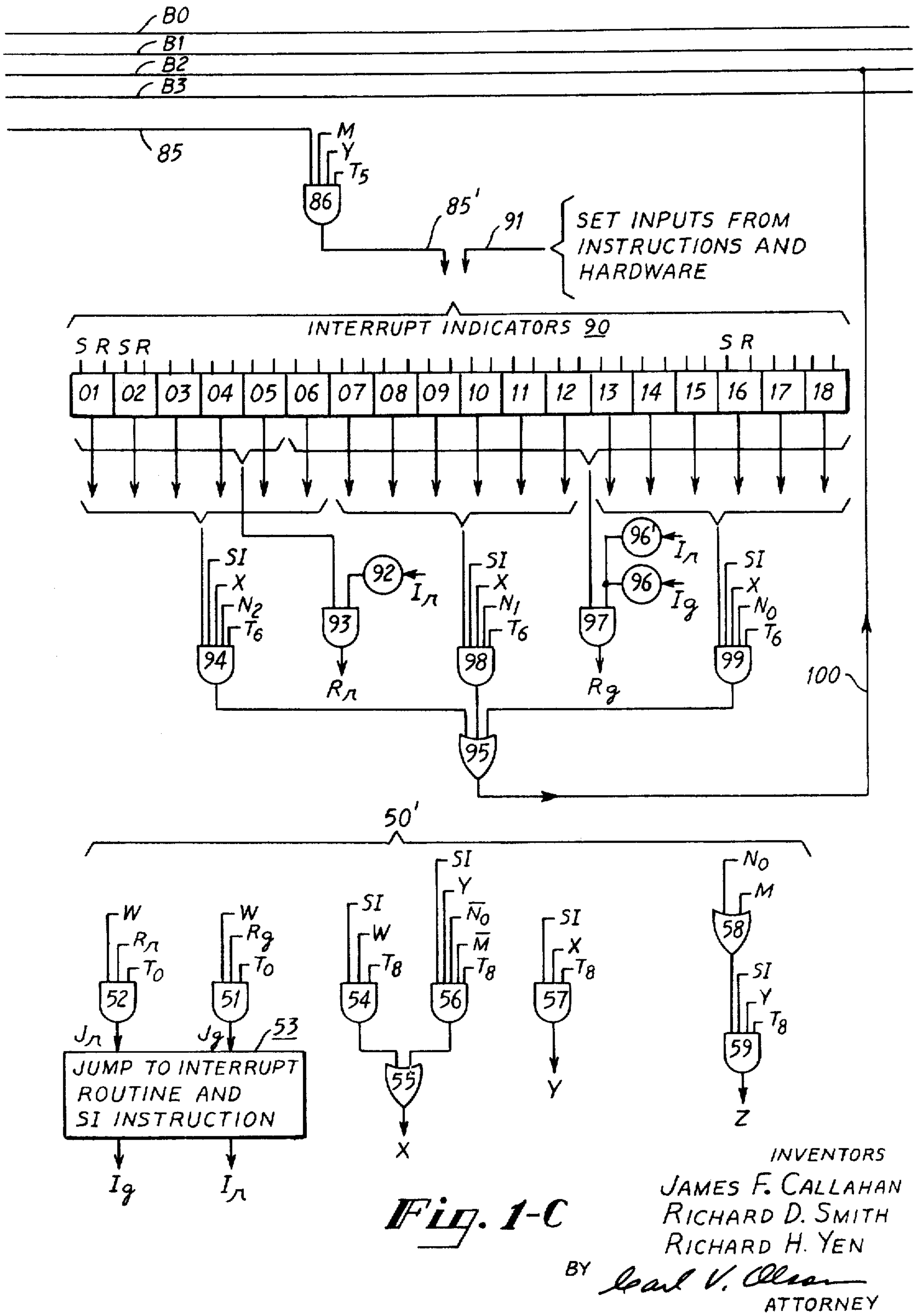
Fig. 1-C
INVENTORS
JAMES F. CALLAHAN
RICHARD D. SMITH
RICHARD H. YEN
BY Carl V. Olson
ATTORNEY

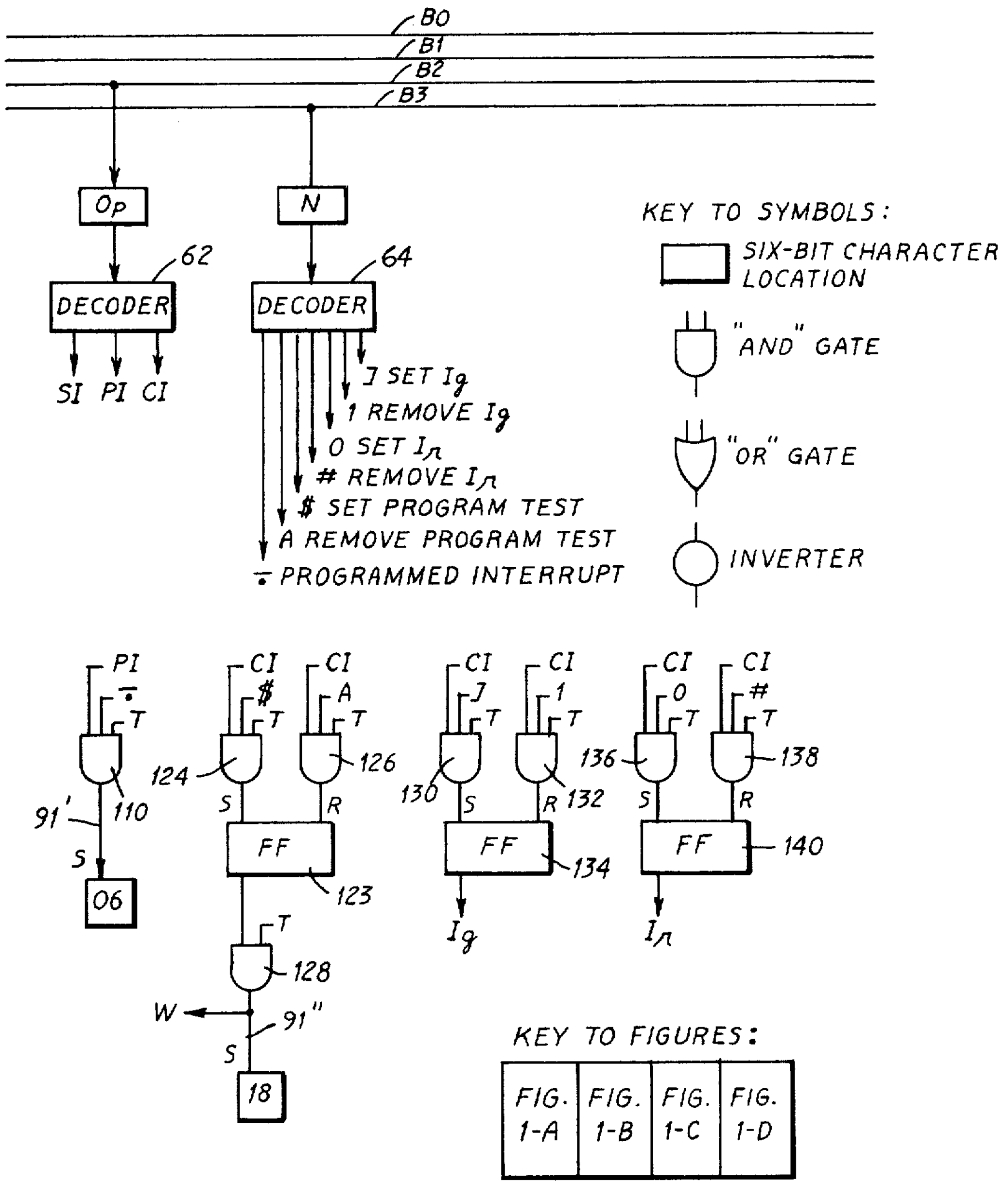
Fig. 1-D
INVENTORS
JAMES F. CALLAHAN
RICHARD D. SMITH
RICHARD H. YEN
BY Carl V. Olson
ATTORNEY

Patented Dec. 6, 1966

3,290,658

ELECTRONIC COMPUTER WITH INTERRUPT FACILITY

James F. Callahan, Willingboro, Richard D. Smith, Moorestown, and Richard H. Yen, Cherry Hill, N.J., assignors to Radio Corporation of America, a corporation of Delaware Filed Dec. 11, 1963, Ser. No. 329,639
11 Claims. (Cl. 340—172.5)

This invention relates to electronic computers capable of temporarily interrupting a program being performed for the performance of a program of higher urgency.

It is the main object of the invention to provide a computer having an improved interrupt facility which operates in obedience to the will of the programmer without the usual limitations imposed by fixed hardware connections.

According to an example of the invention, there are provided a plurality of interrupt indicators each of which is set upon the occurrence of a respective request for interruption originating as the result of a condition in the computer, or as the result of the decoding of an instruction in the program being performed. The set condition of any interrupt indicator causes the program being performed to be interrupted at an interruptable point for the execution of a "scan interrupt indicators" instruction. The "scan interrupt indicators" instruction includes the address of a mask indicating the ones of the interrupt indicators which the programmer will permit to cause an interruption. The means for execution of the "scan interrupt indicators" instruction identifies the highest priority interrupt indicator which is set and not masked and causes the computer to access a particular corresponding memory location where the programmer has previously stored a particular corresponding subroutine to be followed. Any particular interrupt subroutine may be changed at any time by merely changing the contents of the corresponding memory location.

The interrupt facility permits the programmer to insert appropriate instructions in the normal-mode program: to cause the setting of one particular interrupt indicator so that a corresponding particular desired subroutine will be entered into at that point in the normal-mode program; and to cause the setting and removal of interrupt inhibit signals which prevent interruption for a cause of "general" or "real-time" urgency without erasing the set condition of any interrupt indicator.

In the drawing:

FIGS. 1A, 1B, 1C and 1D taken together comprise a schematic diagram of a computer having an interrupt facility.

DESCRIPTION OF COMPUTER

FIG. 1D includes a key to the connected relationship of FIGS. 1A through 1D, and includes a key to the symbols used in FIGS. 1A through 1D.

Reference is now made to FIG. 1A for a description of an illustrative computer having an interrupt facility. The computer, which is character organized, includes a high speed memory HSM for the storage of ten-character instructions and ten-character data words. Each character includes six binary bits, not counting a parity bit which will be ignored in the description. The instruction format illustrated in memory HSM includes an operation code character *Op*, an operation option character N, four A address characters $A_0$, $A_1$, $A_2$ and $A_3$, and four B address characters $B_0$, $B_1$, $B_2$ and $B_3$. A data word, as illustrated, includes ten six-bit data characters $d_0$ through $d_9$. Instruction words and data words may be transferred, one at a time, between the memory HSM and a memory register 20. One, two, three or four characters may be transferred at a time through an interchange 22 to a respective one or ones of four six-conductor busses B0, B1, B2 and B3.

Any one character storage location in the high speed memory HSM may be addressed by four six-bit characters $C_0$, $C_1$, $C_2$ and $C_3$ in an address register 24. The characters $C_0$, $C_1$ and $C_2$ are directed over line 25 to memory HSM to access a complete instruction word or data word. The character $C_3$ in the address register 24 (and other control signals) are applied over line 26 to the interchange 22 to select from one to four characters for transfer between the memory register 20 and the busses B0 through B3. The lines 26 and 25 from the address register 24 are also connected over line 27 to a bus adder 28 from which an incremented or decremented address may be directed through gate 30 to the busses B0 through B3. The interchange 22 operates under the control of gates including the gate 32.

Address register 24 receives four-character addresses via busses B0 through B3 from a current address register labeled "P register" located in a scratch pad memory 34. The scratch pad memory 34 includes a number of four-character storage locations used as registers. The storage locations 35 are used as registers for the current operating condition of the computer. The storage locations 36 are used as registers for storing the status of the computer when there is an interruption for a cause having a priority or urgency designated "general." The storage locations 37 are used as registers for storing the status of the computer when there is an interruption for a cause having a priority or urgency designated "real-time."

Any one of the four-character storage locations or registers in the scratch pad memory 34 may be addressed by a single six-bit character. An address register 40 contains the six-bit character currently used for addressing the scratch pad memory 34. The contents of the address register 40 determines which one of the four-character storage locations in scratch pad memory 34 is selected for the transfer of characters between the scratch pad memory 34 and the busses B0 through B3 via a memory register 44 and gates 46.

The addresses supplied to the scratch pad memory address register 40 are generated by an address generator 48 in response to inputs from a number of gates. The gates include gates designated P, A and B which control the generation of addresses for the respectively-designated registers P, A and B.

The control of the sequence of events in the computer is effected by the usual timing generator and computer control unit 50. The unit 50 receives inputs from all portions of the computer, and provides outputs to all portions of the computer. Some of the elements included in the unit 50 which are particularly involved in the interrupt facility of the computer are shown in FIG. 1C and designated 50′. Specific elements included, which will be referred to at a later point in the description are designated 51 through 59.

When the computer fetches an instruction from the high speed memory HSM for execution, the portions of the instruction are transferred via the main busses to respective staticizing registers. During a first portion of the staticizing cycle, operation code character *Op* is transferred to the staticizing register *Op*, the content of which is decoded by an operation decoder 62. Three of the many outputs of the decoder 62 are shown and designated SI, CI and PI. The instruction option N of the instruction is transferred to a register N, the content of which is decoded by a decoder 64. Some of the many outputs of decoder 64 are shown and designated $N_0$, $\overline{N_0}$, $N_1$, $N_2$, $N_3$, $ and A. The content of the staticizing register N may be decremented by a signal from a gate 65.

During a second portion of the instruction staticizing procedure, the A address portion of the instruction is transferred to the A register in the scratch pad memory 34. During a third portion of the staticizing procedure, the B address portion of the instruction is transferred to the B register in the scratch pad memory 34.

The main busses B0 through B3 continue from FIG. 1A through FIGS. 1B, 1C and 1D. In FIG. 1B the six-conductor bus B2 is connected through a corresponding number of gates 68 to a data register $D_2$ in the arithmetic unit of the computer. Similarly, the six-conductor bus B3 is connected through a corresponding number of gates 69 to a data register $D_3$ in the arithmetic unit.

DESCRIPTION OF INTERRUPT FACILITY

The individual bit outputs of the data registers $D_2$ and $D_3$ are connected to six respective bit comparators 70. Each one of the bit comparators 70 has an individual output lead in the group 72 which carries a signal indicating whether or not a match exists between the two bits supplied to it.

The outputs 72 of the comparator 70 are connected through an "or" gate 74 and a gate 75 to provide an output M which is energized when a match is found. An inverter 79 has an output $\overline{M}$ which is energized when no match is found. The outputs 72 of the comparator 70 are also applied to a priority selector 76 having numbered output lines connected to correspondingly-numbered inputs of eighteen gates in an interrupt indicator identifier circuit 80. If a match is found between more than one of the six bits, the priority selector 76 energizes only the highest priority one of its corresponding outputs at any particular time. The priority selector may be conventional and may include a gate for each set of input and output lines, and inhibiting connections from the input of each gate to the inputs of all gates associated with lower priority sets of input and output lines.

The operation of the eighteen gates in the indicator identifier 80 are controlled by a gate 77. The numbered outputs of the indicator identifier circuit 80 are connected over an eighteen-conductor line 81 to inputs of an indicator number coder or generator 82. The outputs 01 and 11 from identifier 80 are connected to input labeled 1 of gate $2^5$ in coder 82. The same scheme is followed in connecting outputs 02 and 12 through 07 and 17 from identifier 80 to inputs labeled 2 through 7, respectively, of gates $2^5$, $2^4$ and $2^3$ in coder 82. Decoder 82 translates the indicator number represented by energization of one of the eighteen numbered outputs of the identifier 80 into a corresponding indicator number expressed as two six-bit numeric decimal digits. The two digits are supplied to respective character registers $C'_1$ and $C'_2$. (The character registers $C'_1$ and $C'_2$ may be omitted. They are shown in the drawing to suggest that the number they contain consists of two binary-coded decimal digits.) The six outputs of character register $C'_1$ are connected through six gates designated 83 to the six respective conductors of bus B1. Similarly, the six outputs of character register $C'_2$ are connected through six gates 84 to the six conductors of bus B2.

The eighteen-conductor output line 81 of the indicator identifier 80, is also connected through a reset line 85 to FIG. 1C of the drawing to gate 86 and thence to the reset inputs R of eighteen interrupt indicator flip-flops 90. The eighteen interrupt indicators 90 also have individual set inputs to which set signals may be applied over an eighteen-conductor line 91 from eighteen respective sources of requests for interruption of the program being performed. The sources supplying requests for interruption may be circuits responding to respective conditions in the computer, or conditions in the peripheral devices associated with the computer, or may be circuits responding to the decoding of instructions calling for interruption of the program being performed.

The eighteen numbered interrupt indicators 90 are divided into two groups according to priority or urgency. The first five interrupt indicators are indicators of requests for interruption having a priority or urgency designated "real-time." These five outputs are connected through five gates 93 having a common output providing a signal $R_r$ for real-time requests for interruption. The gates 93 may be blocked by an inverted inhibit signal $I_r$ from interrupt routine unit 53 (FIG. 1C). The other thirteen interrupt indicators 06 through 18 correspond with causes of interruption having a lower priority designated "general." The outputs of these thirteen interrupt indicators are connected through thirteen gates 97 having a common output $R_g$ for requests for interruption having a "general" priority. The gates 97 may be blocked by an inverted inhibit signal $I_g$ from unit 53 or by an inverted inhibit signal $I_r$ from unit 53. The eighteen numbered interrupt indicators 90 are also divided into three groups of six indicators each in accordance with the six-bit character organization of the computer. The outputs of the first six interrupt indicators 01 through 06 are connected via six gates 94 to an "or" gate 95. The outputs of the next six indicators 07 through 12 are connected through six gates 98 to "or" gate 95. And the outputs of the last six indicators 13 through 18 are connected through six gates 99 to "or" gate 95. The output of "or" gate 95 is connected over a six-conductor line 100 to the respective six conductors of main bus B2.

DESCRIPTION OF INTERRUPT CONTROLS

The interrupt facility includes inhibit means operative during an interruption to prevent a second interruption for a cause of equal or lesser priority. An inhibit signal on output $I_g$ is generated by the unit 53 (FIG. 1C) whenever the computer has entered into a "general" interrupt routine. The inhibit output $I_g$ is connected through inverter 96 to gate 97. The unit 53 also has an inhibit signal output $I_r$ connected through inverter 92 to gate 93, and through inverter 96' to gate 97.

Reference is now made to FIG. 1D where the operation and option registers O*p* and N shown in FIG. 1A are repeated. The decoders 62 and 64 are also repeated, but the decoder 64 in FIG. 1D is shown to provide additional outputs not indicated on the same decoder 64 as represented in FIG. 1A.

When the instruction staticized in the registers O*p* and N is an instruction calling for the setting of a program-controlled interrupt indicator (indicator 06 in the present example), the decoded PI and ÷ signals from decoders 62 and 64 cause an enabling of a gate 110 (FIG. 1D) having an output over conductor 91' to the set input S of the interrupt indicator 06 (shown again in FIG. 1D) in the group of interrupt indicators 90 shown in FIG. 1C. The conductor 91' is one of the eighteen conductors of the line 91 (FIG. 1C).

Program-controlled means are provided for generating and removing inhibit signals which inhibit or prevent the computer from interrupting the program being performed even though a request for interruption is present and is evidenced by the set condition of an interrupt indicator in the group 90. The control interrupt signal line CI from the decoder 62 (FIG. 1D) and the ] and 1 signal lines from the decoder 64 are connected through gates 130 and 132 to the set and reset inputs, respectively, of the flip-flop 134 to respectively establish and remove a signal $I_g$ for use in inhibiting interruptions having a "general" priority or urgency. Similarly, the 0 and # signal lines from decoder 64 (FIG. 1D) are connected through gates 136 and 138 to flip-flop 140 to respectively establish and remove an inhibit signal $I_r$ used for inhibiting causes of interruption in both the "real-time" and "general" categories.

An instruction called "Set Program Test" is decoded by decoder 62 and decoder 64 to energize outputs CI and $ which are connected through a gate 124 to the set input of a flip-flop 123 having an output connected to a gate 128. An output conductor 91'' from the gate 128 is one of the eighteen conductors of the set line 91 in FIG. 1C and it is the conductor connected to the set input of the interrupt indicator 18 (FIG. 1C) which is allocated to the purpose of program testing. The gate 128 also has an output W connected to gate 51 (FIG. 1C).

Another instruction option, "Remove Program Test," when decoded, results in the energization of the inputs CI and A of gate 126. The output of gate 132 is connected to the reset input of flip-flop 123.

OPERATION DURING INTERRUPTION

The operation of the computer proceeds cycle-by-cycle in a synchronous manner. The computer control 50 (FIG. 1A) includes a timing generator which generates timing pulses $T_0$ through $T_8$. The operation of the computer before, during and after an interruption will be described by references to successive machine cycles designated V, W, X, Y and Z.

*V cycle*

It is assumed that the V cycle is one during which the computer is executing an instruction in its normal-mode program. The instruction is one following which the program can be interrupted, as evidenced by the generation of a signal W by the computer control 50 (FIG. 1A). It is assumed that a request for interruption has been made as the result of the occurrence of a condition in the system, or as the result of the decoding of a staticized instruction which called for an interruption. The request for interruption is directed over one conductor of the eighteen conductor line 91 (FIG. 1C) to the corresponding one of the eighteen interrupt indicators 90. The request for interruption causes the setting of the respective interrupt indicator.

The interrupt hardware is capable of being inhibited to prevent interruption at the option of the programmer. Interruption takes place only in the absence of an inhibit signal $I_g$ or $I_r$ from unit 53. When any one of the indicators is set, and interruption is not inhibited in gate 93 or 97 (FIG. 1C) by a previously generated inhibit signal, a request for interruption signal $R_r$ or $R_g$ is generated by gate 93 or 97. If the set indicator is a real-time indicator, the gate 93 generates a request for interruption signal $R_r$, and if the set indicator is a general indicator, the gate 97 generates a request for interruption signal $R_g$. The previously-mentioned signal W generated in control unit 50 during the V cycle is used to enable the next following W cycle or cycles.

*W cycle*

During the W cycle (which actually involves a number of machine cycles), the interrupt signal $R_r$ or $R_g$ is applied to gate 51 or 52 (FIG. 1C) to generate a jump signal $J_r$ or $J_g$. The jump signal is used by computer control unit 53 to cause an interruption of the program being performed and an entrance into the interrupt program. This is accomplished by transposing the contents of the registers in the scratch pad memory 34 by means including the gate P (FIG. 1A). The contents of the registers 35 containing the normal mode state of the computer are transferred to the general interrupt registers 36 or the real-time interrupt registers 37, depending on whether the request for interruption arose out of a general or a real-time cause.

The contents of the jump P general register or the jump P real-time register is transferred to the P register, which is the instruction register used for the address of the current instruction executed by the machine. The jump P general or jump P real-time register contained the address of the location in the high speed memory of the first instruction in the interrupt routine. This instruction, now being in the P or instruction register, causes the fetching and staticizing of the first instruction in the general or real-time interrupt routine.

The first, or an early, instruction in the interrupt routine, is the instruction SI calling for the scanning of the interrupt indicators. The staticizing of the instruction in the high speed memory involves transferring the operation code character to the O*p* register (FIG. 1A), and transferring the operation option character N to the staticizing register N. The O*p* decoder 62 decodes the contents of the register O*p* and energizes the line SI; and the N decoder 64 decodes the contents of the staticizing register N and energizes an appropriate one of the output lines $N_0$, $\overline{N}_0$, $N_1$, $N_2$ and $N_3$.

The procedure of staticizing the SI instruction also includes the transferring of the A address portion and the B address portion of the instruction to the A register and the B register, respectively, of the scratch pad memory 34 (FIG. 1A). The A address portion of the instruction includes a character $A_0$ predetermined by the programmer, characters $A_1$ and $A_2$ each set equal to zero, and $A_4$ which may be predetermined by the programmer. The contents of the A register, as later modified during execution of the SI instruction, is the address in memory HSM of the particular subroutine to be followed. The B address portion of the instruction is predetermined by the programmer and is the address in memory HSM of the first interrupt indicator mask to be used.

The signals SI, W and timing pulse $T_8$ produce the generation through gates 54 and 55 (FIG. 1C) of an X signal for enabling the following X cycle.

*X cycle*

The previously generated SI and X signals together with timing pulse signals, are used to perform the following transfers: At time $T_0$ the gate B (FIG. 1A) is enabled and directs an output to the address generator 48 which generates the address "4" of the B register in the scratch pad memory 34 and applies it to the address register 40 of the scratch pad memory 34. Then, the contents of the B register is applied through gates 46 and the main busses B0, B1, B2 and B3 to the address register 24 of the high speed memory HSM where it is used to address the memory HSM to read out a mask character (and nine other unneeded characters) into the memory register 20.

At time $T_3$ the contents of the address register 24 is incremented by the bus adder 28 and passed by gate 30 to the main busses. At the same time $T_3$, the gate B is enabled so that the B register in the scratch pad memory 34 is addressed to receive the incremented address from the main busses. Also, at the same time $T_3$, the gate 65 supplies a decrementing signal to the staticizing register N.

At time $T_4$ the gate 32 enables the interchange 22 to direct the mask character in the memory register 20 to the main bus B3. The mask character on the main bus B3 is directed by gate 69 (FIG. 1B) to the data register $D_3$.

At time $T_6$ one of the gates 94, 98, 99 (FIG. 1C) is enabled to direct a group of interrupt indicator bits through "or" gate 95, bus B2 and gate 68 (FIG. 1B) to the data register $D_2$. The particular group of interrupt indicator bits which are thus transferred is determined by the energized one of the outputs $N_2$, $N_1$, $N_0$ from the N decoder (FIG. 1A).

At time $T_8$ the gate 57 (FIG. 1C) generates a signal Y for enabling the next cycle of operation.

*Y cycle*

The six indicator bits of the character in the data register $D_2$ (FIG. 1B) and the six mask bits of the character in the data register $D_3$ are respectively and simultaneously compared in a multiple-bit comparator 70 having six outputs 72. If a match is found, the corresponding output conductor is energized. The six outputs are applied to a priority selector 76 having outputs 1 through 6, only the highest priority one of which is energized if more than one of the bit positions match. The outputs of the comparator 70 are also applied through an "or" gate 74 and a gate 75 which provides, during the Y cycle, a match signal M if a match existed, or at the output of inverter 79, a no-match signal $\overline{M}$ if no match existed. The numbered outputs of the priority selector 76 are connected to similarly-numbered inputs of eighteen gates in the indicator identifier 80. The indicator identifier also receives the energized one of the outputs $N_0$, $N_1$ and $N_2$ from the N decoder 64 (FIG. 1A).

At time $T_2$ the gate 77 (FIG. 1B) energizes the indicator identifier 80 and results in an output on one of the output leads 01 through 18 corresponding with the highest-priority one of the interrupt indicators which was found to be set. The output of the indicator identifier 80 is applied over eighteen-conductor line 81 to the indicator number coder or generator 82 and results in the generation in symbolic character registers $C'_1$ and $C'_2$ of two six-bit characters representing the two decimal digits of the indicator number. The binary-coded decimal character in register $C'_1$ represents either a 0 or a 1. The binary-coded decimal character in register $C'_2$ represents one of the decimal digits 0 through 9.

At time $T_3$ the gates 83 and 84 (FIG. 1B) pass the indicator number characters $C'_1$ and $C'_2$ through busses B1 and B2, respectively, to the middle character positions $C_1$ and $C_2$ of the four characters in the A register (FIG. 1A) in the scratch pad memory 34.

At time $T_5$, if a match signal M exists, the energized one of the outputs of the indicator identifier 80 (FIG. 1B) is applied over one conductor of line 81 and a corresponding one conductor of reset line 85 and through one of the gates 86 (FIG. 1C) to reset the corresponding one of the interrupt indicators 90.

At time $T_8$, either a signal X or a signal Z is generated by means 50' (FIG. 1C). If the output of the N decoder in FIG. 1A is a $\overline{N}_0$ and if the output of the comparator 70 in FIG. 1B indicates the lack of a match by the signal $\overline{M}$, these signals applied to the gate 56 cause the generation of a signal X from "or" gate 55. On the other hand, if an $N_0$ signal or an M signal is present at the input of "or" gate 58, the gate is enabled to cause the generation of a Z signal from the gate 59.

*X cycle or Z cycle*

If the X signal was generated during the preceding Y cycle, the steps in the previously-described X and Y cycles are repeated until a Z signal results. The X and Y cycles are repeated three times if the programmed instruction SI included an option N equal to 3 and herein designated $N_3$. In this case all eighteen interrupt indicators are scanned. Similarly, if N was $N_2$, the X and Y cycles are repeated twice to scan indicators 07 through 12. And, if N and $N_1$, X and Y cycles are performed once to scan indicators 13 through 18. Thereafter the signal Z is generated.

If the Z signal was generated during the preceding Y cycle, the Z signal is interpreted and used by computer control 50 (FIG. 1A) to cause a transfer of the contents of the A register in the scratch pad memory 34 to the current instruction register P in the scratch pad memory.

(Alternatively, the contents of the A register may be transferred to and stored in a so-called "STA" location in high speed memory HSM. Then, a transfer of control instruction, which may follow the scan interrupt indicator instruction in the program, causes the former contents of the A register to be transferred from the "STA" location in memory HSM to the P register. This alternative arrangement gives the programmer further control over the interrupt hardware and also serves to eliminate additional hardware otherwise needed to make automatic the transfer of the contents of the A register to the P register.)

The contents of the A register, now in the P or instruction register, is the address in the high speed memory HSM of the first instruction of a subroutine predetermined by the programmer as one to be followed upon the detection of a request for interruption from the corresponding particular one of the interrupt indicators, or it is the address in high speed memory of the subroutine to be followed in the event that there was no looked-for (unmasked) request for interruption.

By way of review, the initial scan interrupt instruction SI included a four-character A address portion which was transferred to the A register. The four characters are $A_0$ predetermined by the programmer, $A_1$ and $A_2$ each set equal to zero, and $A_3$ which may be predetermined by the programmer. If, during the execution of the SI instruction, an unmasked and set interrupt indicator is found, the number of the interrupt indicator is placed in the positions $A_1$ and $A_2$ of the A register. The contents of the A register then contains the address in the high speed memory HSM of the first instruction of a subroutine to be followed after detection of the particular course of interruption. The particular subroutine and others were previously stored in memory HSM by the programmer at locations having addresses identified by programmed character $A_0$ and $A_3$ and by indicator-identifying characters $A_1$ and $A_2$.

If execution of the scan interrupt instruction SI did not result in the finding of a set and unmasked interrupt indicator, the two middle characters $A_1$ and $A_2$ in the A register are still zeros. The characters $A_0$, $A_1$, $A_2$ and $A_3$ in the A register then represent the address in memory HSM of the first instruction to be followed in the event that no request for interruption is found. This first instruction may be an instruction causing the computer to jump back to its normal mode program.

INTERRUPTION BY PROGRAMMED INSTRUCTION

The interrupt procedure which has been described is always initiated (if not inhibited) by the setting of one of the eighteen interrupt indicators 90. Most of the interrupt indicators are set automatically when some predetermined condition occurs in the hardware of the computer. Such occurrences may, for example, be a request from the console, an arithmetic error, an arithmetic overflow, a busy or unoperable peripheral device or a normal or abnormal termination of a simultaneous mode of operation. In addition, one of the interrupt indicators is assigned to be controlled by the programmer, rather than by the operation of the hardware of the computer.

The interrupt indicator designated 06 in the present example is reserved for programmed interruptions. The interrupt indicator 06 is set as the result of the decoding of an instruction written by the programmer and inserted in a program being performed.

When a programmed interrupt instruction is staticized by the computer, the PI output of the *Op* decoder 62 (FIG. 1D) is energized, and the ÷ output of the N decoder 64 is energized. These two signals enable the gate 110 to provide a signal over one of the set conductors 91' which sets the interrupt indicator 06 in the group of interrupt indicators 90 (FIG. 1C). When the interrupt indicator 06 is set, the interrupt routine, which has been described, including the scan interrupt indicator instruction SI, is entered into. The computer scans the interrupt indicators, identifies indicator 06 as the one which is set, and then enters into the particular subroutine which the programmer wishes to be followed.

INTERRUPTION PRIORITIES

The program interruption procedure which has been described may be prevented or inhibited by the presence of inhibit signals $I_r$ or $I_g$ at the inverter inputs (FIG. 1C) of gates 93 and 97. The various conditions under which the inhibit signals $I_r$ and $I_g$ are generated will now be described.

The interrupt hardware in the computer prevents or inhibits the interruption of an interrupt routine or subroutine on the occurrence of a second request for interruption due to a cause of equal or lower priority. When the program being performed is interrupted, as has been described by the application of a jump signal $J_g$ or $J_r$ to the unit 53 (FIG. 1C), the program being performed is interrupted, and the computer jumps to the performance of the interrupt routine which includes the scan interrupt indicator instruction SI. When this happens, the unit 53 generates appropriate signals for the control of the computer, and also generates an appropriate one of the inhibit signals $I_g$ or $I_r$. If the interrupt routine entered into is a "general" interrupt routine, the inhibit signal $I_g$ is generated and applied through the inverter 96 at the input of gate 97. This input blocks an output $R_g$ from the gate 97 so that the gate 51 is disabled and cannot cause an interruption of the "general" interrupt routine or subroutine being performed.

However, the "general" interrupt routine or subroutine being performed can itself be interrupted for the performance of a higher priority "real-time" request for interruption. Such a "real-time" request $R_r$ from gate 93 enables gate 52 and causes a jump signal $J_r$. The signal $J_r$ supplied to the unit 53 causes the computer to interrupt the "general" interrupt routine or subroutine and jump to the "real-time" interrupt routine.

Whenever unit 53 causes the computer to jump to the performance of the "real-time" routine and subroutine, the unit 53 also provides an inhibit output $I_r$ which is applied through the inverters 92 and 96' to both of gates 93 and 97 to prevent interruption of the "real-time" routine or subroutine by a "real-time" request for interruption or by a "general" request for interruption.

To summarize, a normal-mode program may be interrupted by either a "general" or "real-time" request for interruption. A "general" interrupt routine or subroutine can be interrupted only by a "real-time" request for interruption. A "real-time" interrupt routine or subroutine cannot be interrupted.

PROGRAMMED INHIBITION OF INTERRUPTION

The programmer can prevent or inhibit interruption of any portion of a program by including instructions in the program which determine the point from which interruptions are not permitted and which determine the later point from which interruptions are again permitted. The instructions can inhibit either "general" or "real-time" interruptions at the programmer's option.

A "set general inhibit" instruction when decoded results in a signal SI from decoder 62 (FIG. 1D) and a signal ] from decoder 64. These signals applied to gate 130 cause a setting of the flip-flop 134 and a generation of a general inhibit signal $I_g$ which is applied to gate 97 (FIG. 1C) to prevent the interruption of the program being performed for any "general" cause. A "remove general inhibit" instruction results in decoded signals CI and 1 which act through gate 132 to reset the flip-flop 134 and remove the inhibit signal $I_g$.

Similarly, a "set real-time inhibit" instruction results in decoded signals CI and 0 which enable gate 136 to set flip-flop 140 and generate the real-time inhibit signal $I_r$. A following "remove real-time inhibit" instruction results in decoded signals CI and # which enable gate 138 to reset flip-flop 140 and terminate the real-time inhibit signal $I_r$.

PROGRAM TESTING OR DEBUGGING

A description will now be given of the operation of means by which the computer may be used to locate errors in a program supplied to, and being executed by, the computer. It is a common experience to find that a long and complex program includes some error which results in an obviously erroneous final result. For example, it may be found that the information stored in a particular memory location has been incorrectly changed at some unknown point during the execution of the program. It is then a very long and laborious process to study the program which was written to determine the point at which an erroneous instruction caused the undesired change in the contents of the memory location. The computer itself is used to find the error in the program by means of hardware designed to respond to an instruction called "set program test mode."

The "set program test mode" instruction results in decoded signal CI and $ from decoders 62 and 64 (FIG. 1D) which are applied to enable gate 124 and set the flip-flop 123. The output of flip-flop 123 is applied through gate 128 at appropriate times T to generate a signal W and to generate a signal which sets the program test interrupt indicator 18 in the group of interrupt indicators 90 (FIG. 1C). The signal W from gate 128 and the signal $R_g$ from gate 97 (FIG. 1C) enable the gate 51 and causes the unit 53 to jump the normal-mode program being performed at the end of every one of the normal-mode instructions therein.

The computer then goes into the 'general" interrupt routine, which has been described, to identify the interrupt indicator 18 as the one which is set, and to enter into a programmed subroutine designed by the programmer to find the point in the program at which the error occurs. The subroutine may be one during which a comparison is made between the previous contents of the disturbed memory location and the present contents of the memory location. The subroutine may also include the use of the results of the comparison to print out or otherwise identify the point in the program where the disturbance of the contents of the memory location occurred.

The performance of the interrupt routine and the "test program mode" subroutine results in a resetting of the interrupt indicator 18. However, information retained in flip-flop 123 causes the indicator to be again set during performance of the following normal-mode instruction. Once the flip-flop 123 has been set, as described, the computer performs the program test interrupt procedure after each normal-mode instruction. This program testing procedure can be made to cease at any point in the normal-mode program by inserting therein a "remove program test" instruction. This instruction, when decoded, enables gate 126 which resets the flip-flop 123 and discontinues further performance of the program testing interrupt procedure.

SUMMARY

The interrupt facility described is one characterized in that: (1) The programmer can determine by the number given to the character N in the "scan interrupt indicators" instruction whether one, two or all three of the groups of interrupt indicators should be scanned. (2) The programmer can determine by the B address in the "scan interrupt indicators" instruction which interrupt indicators in each group should be permitted to cause an interruption. (3) The programmer can insert an instruction which sets the interrupt indicator 06 and causes the interruption of the program being performed for the performance of an interrupt subroutine desired by the programmer. (4) The programmer can insert instructions which inhibit interruption for any "general" or any "real-time" cause. (5) The programmer can insert an instruction which causes interruption after all normal mode instructions for the purpose of testing or debugging the program.

In general, the interrupt facility is one wherein the course followed by the computer is under the control of the programmer without the usual limitations imposed by fixed and predetermined hardware connections.

What is claimed is:

1. An electronic computer having a program-controlled interrupt facility comprising a plurality of interrupt indicators each adapted to be set in response to a request for interruption due to the occurrence of a respective condition, means responsive to the setting of any interrupt indicator to cause an interruption of the program being performed and a jump to the performance of a stored program which scans the conditions of the interrupt indicators and generates an address peculiar to the conditions found, and means utilizing said address to fetch and enter into the performance of a corresponding stored-program interrupt subroutine, or to return to the performance of the interrupted program.

2. An electronic computer having a program-controlled interrupt facility comprising a plurality of interrupt indicators each adapted to be set in response to a request for interruption due to the occurrence of a respective condition, means responsive to the setting of any interrupt indicator to cause an interruption of the program being performed and a jump to the performance of a stored program which scans the conditions of program-selected ones of the interrupt indicators and generates an address peculiar to the conditions found, and means utilizing said address to fetch and enter into the performance of a corresponding stored-program interrupt subroutine, or to return to the performance of the interrupted program.

3. An electronic computer having a program-controlled interrupt facility comprising a plurality of interrupt indicators each adapted to be set in response to a request for interruption due to the occurrence of a respective condition, interrupt indicator scanning means responsive to the setting of any interrupt indicator to cause an interruption of the program being performed and a jump to the performance of a stored program which scans the conditions of program-selected ones of the interrupt indicators and generates an address peculiar to the conditions found, means utilizing said address to fetch and enter into the performance of a corresponding stored-program interrupt subroutine, or to return to the performance of the interrupted program, and program-controlled means to inhibit operation of said interrupt indicator scanning means.

4. An electronic computer having a program-controlled interrupt facility for interrupting the performance of its lowest priority normal-mode program, comprising a group of general priority and a group of real-time highest-priority interrupt indicators, each indicator being adapted to be set in response to a request for interruption due to the occurrence of a respective conditions, interrupt indicator scanning means responsive to the setting of any interrupt indicator to cause an interruption of the program being performed and a jump to the performance of a stored program which scans the conditions of program-selected ones of the interrupt indicators and generates an address peculiar to the conditions found, means utilizing said address to fetch and enter into the performance of a corresponding general or real-time interrupt subroutine, or to return to the performance of the interrupted program, and means operative following an interruption to inhibit the operation of said interrupt indicator scanning means in response to a request for interruption of equal or lower priority.

5. An electronic computer having a program-controlled interrupt facility for interrupting the performance of its lowest priority normal-mode program, comprising a group of general priority and a group of real-time highest-priority interrupt indicators, each indicator being adapted to be set in response to a request for interruption due to the occurrence of a respective condition, interrupt indicator scanning means responsive to the setting of any interrupt indicator to cause an interruption of the program being performed and a jump to the performance of a stored program which scans the conditions of program-selected ones of the interrupt indicators and generates an address peculiar to the conditions found, means utilizing said address to fetch and enter into the performance of a corresponding general or real-time interrupt subroutine, or to return to the performance of the interrupted program, means operative following an interruption to inhibit the operation of said interrupt indicator scanning means in response to the setting of an interrupt indicator in an equal-priority or lower-priority group, and means responsive to excution of a programmed normal-mode instruction to cause inhibition of operation of said interrupt indicator scanning means due to the setting of an interrupt indicator in one or the other or both of the general and real-time groups.

6. An electronic computer having a program-controlled interrupt facility comprising a memory having storage locations for instructions of a normal-mode program, an interrupt routine, and interrupt subroutines for respective different causes of interruption, and having storage locations for interrupt scanning masks, a plurality of interrupt indicators each adapted to be set in response to a request for interruption due to the occurrence of a respective condition, means responsive to the setting of any interrupt indicator to cause an interruption of the program being performed and a jump to said interrupt routine which includes an instruction calling for the scanning of interrupt indicators and a comparison of the states of the indicators with the states of an interrupt scanning mask, means responsive to the result of said comparison to generate the address in memory of the corresponding subroutine which is to be followed, or to return to the performance of the interrupted program, and means to fetch and execute said subroutine.

7. An electronic computer having a program-controlled interrupt facility comprising a memory having storage locations for instructions of a normal-mode program, an interrupt routine, and interrupt subroutines for respective different causes of interruption, and having storage locations for interrupt scanning masks, registers, including an instruction register, for containing addresses in memory of said storage locations, a plurality of interrupt indicators each adapted to be set in response to a request for interruption due to the occurrence of a respective condition, means responsive to the setting of any interrupt indicator to cause an interruption of the program being performed and a transfer of the address of the interrupt routine from a register to the instruction register, said interrupt routine including an instruction calling for a scan interrupt indicator operation, and the address of the location in memory of an interrupt scanning mask, a comparator, means to apply the states of said interrupt indicators and the addressed interrupt scanning mask to said comparator to provide an output corresponding with an indicator which is set and not masked, means responsive to said comparator to generate the address of the corresponding subroutine in memory which is to be followed, and means to transfer said address to said instruction register to initiate performance of the subroutine.

8. An electronic computer having a program-controlled interrupt facility comprising a memory having storage locations for instructions of a normal-mode program, an interrupt routine, and interrupt subroutines for respective different causes of interruption, and having storage locations for interrupt masks, registers, including an instruction register, for containing addresses in memory of said storage locations, a plurality of interrupt indicators each adapted to be set in response to a request for interruption due to the occurrence of a respective condition, means responsive to the setting of any interrupt indicator to cause an interruption of the program being performed and a transfer of the address of the interrupt routine from a register to the instruction register, said interrupt routine including an instruction calling for a scan interrupt indicator operation, the incomplete address of locations in memory containing interrupt subroutines, and the address of the location in memory of an interrupt scanning mask, a comparator, means to apply the states of said interrupt indicators and the addressed interrupt scanning mask to said comparator to provide an output corresponding with an indicator which is set and not masked, means responsive to said comparator to generate the remainder of the address of the corresponding subroutine in memory which is to be followed, and means to transfer said address to said instruction register to initiate performance of the subroutine.

9. The combination of an electronic computer having an instruction format including an operation code O*p*, an operation option N, an A addresss and a B address, having corresponding registers, and having an instruction register for the address in memory of the next instruction to be executed, a memory having storage locations for instructions of a normal mode program, an interrupt routine, and interrupt subroutines for respective different causes of interruption, and having storage locations for interrupt masks, a plurality of interrupt indicators each adapted to be set in response to a request for interruption due to the occurrence of a respective condition, means responsive to the setting of any interrupt indicator to cause an interruption of the program being performed and the fetching and staticizing of an interrupt routine instruction wherein N is a number corresponding with a group of interrupt indicators and B is the address in memory of a corresponding desired mask, a comparator, means to decode the contents of said O*p* and N registers and cause the application to said comparator of the status bits of a specified group of said interrupt indicators and bits of a specified corresponding mask to provide an output indicating the presence or absence of a set and unmasked interrupt indicator, means responsive to the contents of the N register and the output of the comparator to generate a corresponding address and place it in the A register, and means to cause the contents of the A register to be used for addressing the memory location containing the corresponding particular subroutine desired to be performed.

10. The combination of an electronic computer having an instruction format including an operation code O*p* an operation option N, an A address and a B address, having corresponding registers, and having an instruction register for the address in memory of the next instruction to be executed, a memory having storage locations for instructions of a normal mode program, an interrupt routine, and interrupt subroutines for respective different causes of interruption, and having storage locations for interrupt masks, a plurality of interrupt indicators each adapted to be set in response to a request for interruption due to the occurrence of a respective condition, means responsive to the setting of any interrupt indicator to cause an interruption of the program being performed and the fetching and staticizing of an interrupt routine instruction wherein N is a number corresponding with a group of interrupt indicators and B is the address in memory of a corresponding desired mask, a comparator, means to decode the contents of said O*p* and N registers and cause the application to said comparator of the status bits of a specified group of said interrupt indicators and bits of a specified corresponding mask to provide an output indicating the presence or absence of a set and unmasked interrupt indicator, means responsive to the contents of the N register and the output of the comparator, if there is no set and unmasked interrupt indicator, to repeat the comparison process with the next group of interrupt indicators and the next corresponding mask until a set and unmasked indicator is found or until the last group is compared, and, if there is a set and unmasked interrupt indicator, to generate the number of the interrupt indicator and place it in the A register, and means to cause the contents of the A register to be used for addressing the memory location containing the corresponding particular subroutine desired to be performed.

11. In an electronic computer having a program-controlled interrupt facility for interruption the performance of its normal-mode program, said electronic computer having an instruction format including an operation code O*p*, an operation option N, an A address and a B address, having corresponding registers, and having an instruction register for the address in memory of the next instruction to be executed, the combination of a memory having storage locations for instructions of a normal mode program, an interrupt routine, and interrupt subroutines for respective different causes of interruption, and having storage locations for interrupt masks, a group of general priority and a group of real-time higher-priority interrupt indicators, each indicator being adapted to be set in response to a request for interruption due to the occurrence of a respective condition, means responsive to the setting of any interrupt indicator to cause an interruption of the program being performed and the fetching and staticizing of an interrupt routine instruction wherein N is a number corresponding with a group of interrupt indicators and B is the address in memory of a corresponding desired mask, a comparator, means to decode the contents of said O*p* and N registers and cause the application to said comparator of the status bits of a specified group of said interrupt indicators and bits of a specified mask to provide an output indicating the presence or absence of a set and unmasked interrupt indicator, means responsive to the contents of the N register and the output of the comparator, if there is no set and unmasked interrupt indicator, to repeat the comparison process with the next group of interrupt indicators and the next corresponding mask until a set and unmasked indicator is found or until the last group is compared, and, if there is a set and unmasked interrupt indicator, to generate the number of the interrupt indicator and place it in the A register, means to cause the contents of the A register to be used for addressing the memory location containing the corresponding particular subroutine desired to be performed, means operative during an interruption to inhibit the operation of said means to cause an interruption for a cause of equal or lower priority, and means responsive to execution of a programmed normal-mode instruction to cause inhibition of operation of said means to cause an interruption.

References Cited by the Examiner

UNITED STATES PATENTS

| | | | |
|---|---|---|---|
| 3,048,322 | 8/1962 | Brooks | 340—172.5 |
| 3,061,192 | 10/1962 | Terzian | 340—172.5 |
| 3,079,082 | 2/1963 | Scholten | 340—172.5 |

FOREIGN PATENTS 892,433 3/1962 Great Britain.

OTHER REFERENCES

Planning a Computer System, project stretch edited by Werner Buchholz, McGraw-Hill, 1962, pp. 137–146.

ROBERT C. BAILEY, *Primary Examiner.*

P. L. BERGER, *Assistant Examiner.*